(12) United States Patent
Stanton et al.

(10) Patent No.: US 9,190,886 B2
(45) Date of Patent: Nov. 17, 2015

(54) FOOT-POWERED ENERGY GENERATOR

(71) Applicant: Sole Power, LLC, Pittsburgh, PA (US)

(72) Inventors: Matthew James Stanton, Pittsburgh, PA (US); Hahna Alexander, Pittsburgh, PA (US); Spencer Williams, Portland, OR (US); Sarah Stroup, Corning, NY (US); Arianna Golden, El Sobrante, CA (US)

(73) Assignee: Sole Power, LLC, Pittsburgh, PA (US)

(*) Notice: Subject to any disclaimer, the term of this patent is extended or adjusted under 35 U.S.C. 154(b) by 0 days.

(21) Appl. No.: 14/627,187

(22) Filed: Feb. 20, 2015

(65) Prior Publication Data

US 2015/0162803 A1    Jun. 11, 2015

Related U.S. Application Data

(63) Continuation-in-part of application No. 13/873,021, filed on Apr. 29, 2013, now Pat. No. 8,970,054.

(60) Provisional application No. 61/687,596, filed on Apr. 27, 2012.

(51) Int. Cl.
| | |
|---|---|
| *F02B 63/04* | (2006.01) |
| *H02K 7/10* | (2006.01) |
| *H02K 7/18* | (2006.01) |
| *F03G 5/06* | (2006.01) |
| *A43B 7/02* | (2006.01) |
| *A61F 2/68* | (2006.01) |

(52) U.S. Cl.
CPC ............... *H02K 7/1861* (2013.01); *F03G 5/06* (2013.01); *H02K 7/1853* (2013.01)

(58) Field of Classification Search
USPC .................. 290/1 D, 1 R; 36/2.6; 623/52
See application file for complete search history.

(56) References Cited

U.S. PATENT DOCUMENTS

| | | | |
|---|---|---|---|
| 1,272,931 A | 7/1918 | Etheridge | .......................... 36/2.6 |
| 1,506,282 A | 8/1924 | Barbieri | ...................... 310/75 B |
| 3,534,391 A | 10/1970 | Bauer | ........................... 219/211 |
| 3,800,212 A * | 3/1974 | Branco et al. | ................... 322/28 |
| 4,674,199 A | 6/1987 | Lakic | ................. 36/2.6 |
| 4,782,602 A | 11/1988 | Lakic | ................. 36/2.6 |
| 4,845,338 A | 7/1989 | Lakic | ................. 219/211 |
| 5,167,082 A | 12/1992 | Chen | ................. 36/2.6 |
| 5,367,788 A | 11/1994 | Chen | ................. 36/3 B |
| 5,391,080 A | 2/1995 | Bernacki et al. | ............. 434/254 |
| 5,495,682 A | 3/1996 | Chen | ................. 36/2.6 |
| 5,866,987 A | 2/1999 | Wut | ........................... 315/119 |
| 6,201,314 B1 | 3/2001 | Landry | .......................... 290/54 |
| 6,239,501 B1 | 5/2001 | Komarechka | ................. 290/1 R |
| 6,255,799 B1 | 7/2001 | Le et al. | ........................ 320/107 |
| 6,281,594 B1 | 8/2001 | Sarich | ........................ 290/1 R |

(Continued)

FOREIGN PATENT DOCUMENTS

KR    20090007638 U    7/2009

*Primary Examiner* — Pedro J Cuevas
(74) *Attorney, Agent, or Firm* — Fox Rothschild LLP

(57) ABSTRACT

A foot-powered energy generation device includes a step plate that moves between an upper position and a lower position in response to the step action of a user. The device also includes an electrical generator, and a gear train that will cause a rotor of the generator to rotate in response to movement of the step plate up and down. A carriage is mechanically interconnected to the step plate and the gear train to cause the rotation of the gear train in response to the step plate motion.

48 Claims, 12 Drawing Sheets

(56) References Cited

U.S. PATENT DOCUMENTS

| | | | |
|---|---|---|---|
| 6,744,145 B2 | 6/2004 | Chang | 290/1 R |
| 6,865,825 B2 | 3/2005 | Bailey, Sr. et al. | 36/88 |
| 6,899,737 B1 | 5/2005 | Phillips et al. | 623/52 |
| 7,063,727 B2 | 6/2006 | Phillips et al. | 623/52 |
| 7,080,849 B2 * | 7/2006 | Lammer | 280/602 |
| 7,081,685 B2 | 7/2006 | Chiu | 290/1 R |
| 7,107,706 B1 | 9/2006 | Bailey, Sr. et al. | 36/88 |
| 7,186,957 B2 | 3/2007 | Martin | 219/529 |
| 7,204,041 B1 | 4/2007 | Bailey, Sr. et al. | 36/29 |
| 7,279,011 B2 | 10/2007 | Phillips | 623/53 |
| 7,327,046 B2 * | 2/2008 | Biamonte | 290/1 R |
| 7,354,456 B2 | 4/2008 | Phillips | 623/52 |
| 7,395,614 B1 | 7/2008 | Bailey, Sr. et al. | 36/28 |
| 7,409,784 B2 | 8/2008 | Yeh | 36/136 |
| 7,699,499 B2 | 4/2010 | Liao | 362/276 |
| 7,956,476 B2 | 6/2011 | Yang | 290/1 R |
| 7,956,753 B2 | 6/2011 | Fogg | 340/573.1 |
| 8,087,186 B2 | 1/2012 | Rastegar et al. | 36/2.6 |
| 8,322,876 B2 | 12/2012 | Tseng et al. | 362/103 |
| 8,674,527 B2 | 3/2014 | Fyke et al. | 290/1 R |
| 8,866,314 B2 | 10/2014 | Linevich | 290/1 C |
| 8,872,364 B2 | 10/2014 | Tsai | 290/1 C |
| 9,024,462 B2 * | 5/2015 | Thramann | 290/54 |
| 2004/0035243 A1 | 2/2004 | Duval | 74/589 |
| 2008/0277552 A1 | 11/2008 | Duval | 248/280.11 |
| 2010/0223813 A1 | 9/2010 | Ozturk | 36/105 |
| 2013/0020986 A1 | 1/2013 | Linzon et al. | 320/107 |
| 2013/0033042 A1 | 2/2013 | Fortier et al. | 290/54 |
| 2013/0104425 A1 | 5/2013 | Kalra-Lall | 36/103 |
| 2013/0185961 A1 | 7/2013 | Tseng | 36/137 |
| 2013/0219743 A1 | 8/2013 | Ye | 36/2.6 |
| 2014/0183873 A1 | 7/2014 | Yoo et al. | 290/1 C |

* cited by examiner

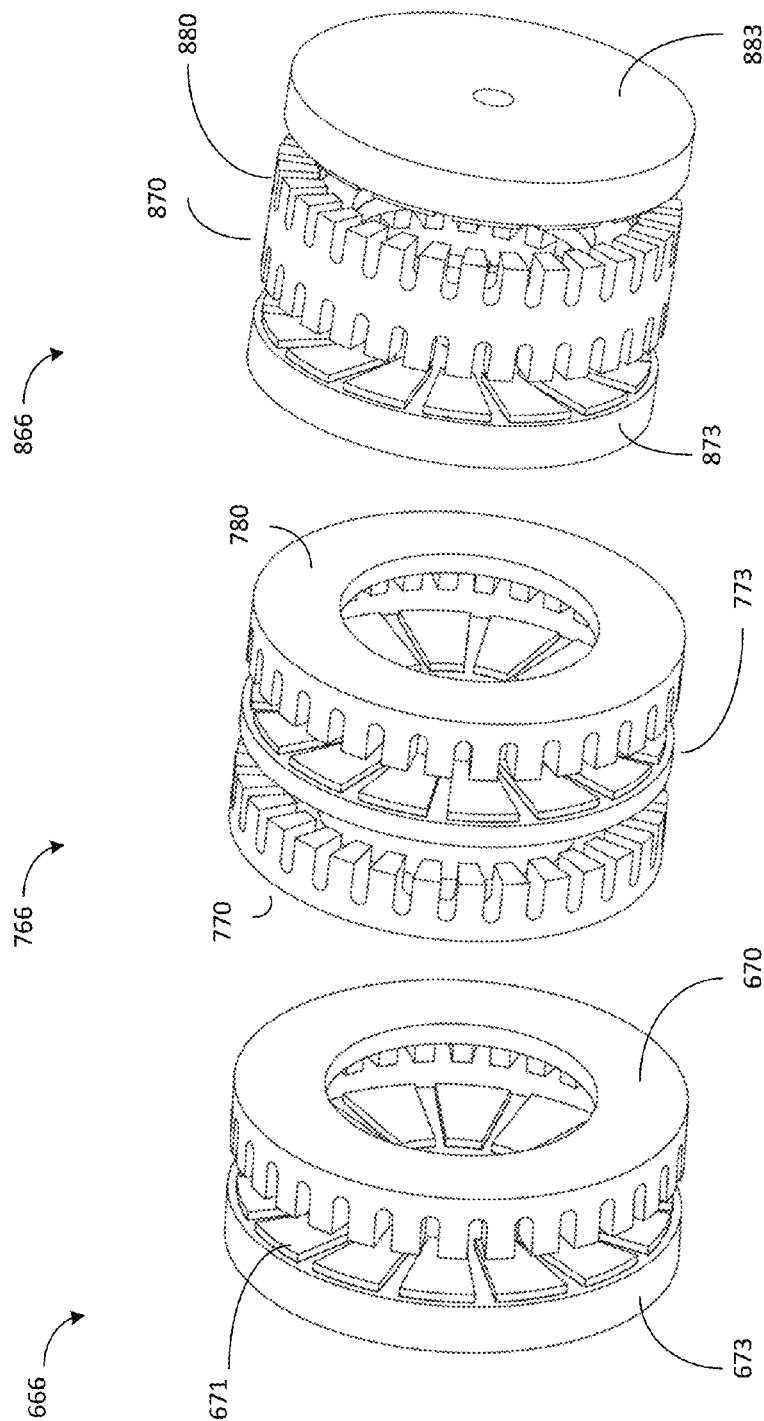

FOOT-POWERED ENERGY GENERATOR

CROSS-REFERENCE TO RELATED APPLICATIONS

This patent document is a continuation-in-part of U.S. patent application Ser. No. 13/873,021, filed Apr. 29, 2013, which claims priority to U.S. provisional patent application No. 61/687,596, filed Apr. 27, 2012. The disclosures of each priority application are fully incorporated by reference.

BACKGROUND

This document relates to wearable systems for generating power for use in charging batteries and portable electronic devices.

As portable electronics like smartphones, GPS systems, wearable electronic devices, fitness electronics and other electronic devices have become ubiquitous; the need to charge such devices has become extremely important. Many people around the world have access to cheap, portable electronics but lack a suitable means to charge them.

To date, the most common portable charging solutions are backup battery and solar powered solutions. However, those solutions require users to carry additional equipment, and even those solutions only provide charges for a limited period of time. Backup batteries must themselves be recharged, and solar powered solutions are only useful during daylight hours or when artificial light sources are available.

This document describes methods and systems that are directed to solving at least some of the problems described above.

SUMMARY

In an embodiment, a foot-powered energy generation device includes a step plate that moves between an upper position and a lower position in response to the step action of a user. The device also includes an electrical generator and a gear train that will cause a rotor of the generator to rotate when the step plate moves up and down. A carriage is mechanically interconnected to the step plate and the gear train to cause the rotation of the gear train in response to the step plate motion.

In another embodiment, a foot-powered energy generation device includes a base configured to fit within a footwear item, a step plate having an upper position and a lower position, and a generator comprising a rotor. A gear train comprising a first gear and a second gear is configured so that rotation of the first gear will cause the second gear to rotate, optionally via one or more intermediary gears. Rotation of the second gear will cause the rotor to rotate. A carriage is mechanically interconnected to the step plate and the first gear so that the carriage will cause the first gear to rotate in response to movement of the step plate between the upper position and the lower position.

Optionally, the device may include a linkage that mechanically interconnects the step plate to the carriage so that when pressure is applied to the step plate and moves the step plate toward the lower position, the linkage will cause the carriage to move in a first direction away from a first position. When pressure is released from the step plate so that the step plate moves up toward the upper position, the linkage will cause the carriage to return to the first position. Optionally, the linkage may comprise a spring that is also configured to return the step plate to the upper position when pressure is released from the step plate. Optionally, the step plate may be integral with or a surface of the linkage. In another option, the step plate may be integral with the carriage. Any number of step plates may be used.

Optionally, the carriage may have an opening configured to receive and engage the first gear. The opening may have opposing first and second sides and a lateral dimension between the first and sides. The lateral dimension may larger than a diameter of the first gear so that when the carriage moves in a first direction away from a first position, the first side of the opening will engage the first gear and cause the first gear to rotate in a direction of rotation. When the carriage moves in a second direction to return to the first position, the second side of the opening will engage the first gear and cause the first gear to rotate in the direction of rotation.

In some embodiments, the gear train may include a planetary gear having a center. If so, the center of the planetary gear and the center of the rotor may both rotate around the same axis. The gear train also may include at least one intermediary gear that is positioned and configured to mechanically interconnect the first gear to the planetary gear. The gear train may be configured so that each gear in the gear train is positioned along a plane that is substantially parallel to the base.

Optionally, the device also may include clutch that is configured to engage the carriage with the gear train and disengage the carriage from the gear train. Alternatively, the clutch may be configured to cause the first gear to be engaged with the second gear when a speed of rotation of the first gear exceeds a threshold, and to cause the first gear to be disengaged from the second gear when the speed of rotation of the first gear does not exceed the threshold.

In various embodiments, the generator may be a radial permanent magnet generator, an axial permanent magnet generator, or another type of generator.

The device also may include, or it may be, a footwear item, such as a shoe, boot, insole, heel or other housing that is configured to be worn on a foot.

BRIEF DESCRIPTION OF THE DRAWINGS

FIGS. 6-8 illustrate examples of axial generators that the device may include.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this document, the terms "footwear item," "article of footwear" and the like refer to apparel that is configured to be worn on a foot, as well as components of such apparel. Examples include shoes, boots, sandals, thongs, socks and the like. Examples also include components such as insoles, soles, heels, and the like. In some embodiments, a "footwear item" also may be a prosthesis that is configured to replace a foot, or a foot shell that is used with a prosthesis. Footwear may be configured to be worn on human feet, or on animals such as horses.

As used in this document, the term "mechanically interconnected," when used to describe two or more items, means that the items are mechanically related to each other, either by a direct mechanical connection or indirectly via one or more other components, so that movement of at least one of the items will also cause the other item(s) to move. Mechanically interconnected components need not be connected at all times, so long as they are configured directly or indirectly engage with each other at some point during operation of the system of which they are a part.

As used in this document, the term "portable electronic device" refers to a device that includes electronic components and which requires a source of power to operate. Examples of portable electronic devices include smartphones, global positioning system (GPS), wearable electronic devices such as smart watches and smart eyeglasses, fitness electronics, cameras, media players, laptop computers and electronic tablets.

Portable electronic devices like mobile phones and laptops require sources of power, such as a battery or an active power supply. It can be inconvenient and expensive to constantly need to find a power supply or carry backup batteries. This document describes a device and system that helps to solve this problem by harvesting energy from the act of a human taking a step. The system is wearable in that some or all of it may be attached to or integrated within an item of footwear, such as a boot, shoe or insole.

Figure 1A:
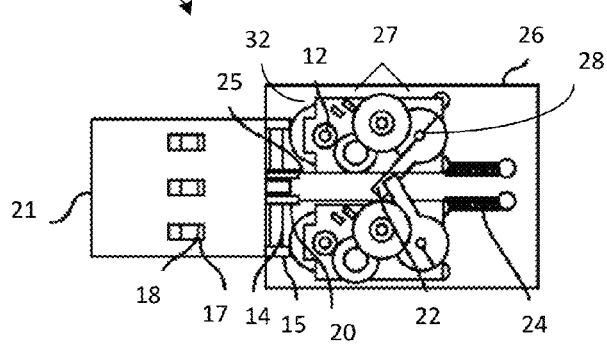
FIGS. 1A-1C illustrate various views of a first embodiment of a foot-powered energy generation device.
Figure 1B:
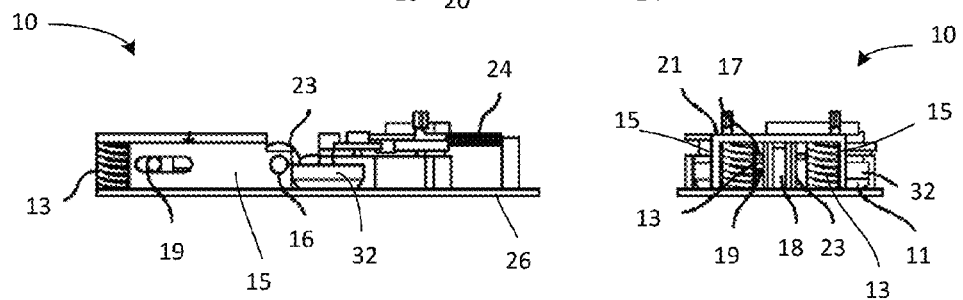
Figure 1C:
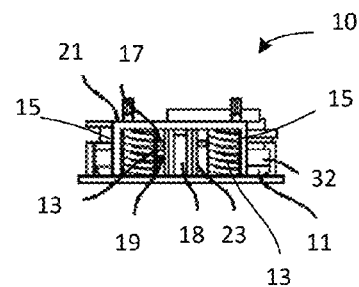

FIGS. 1A through 1C illustrate a first embodiment, in which a foot-powered energy generation device 10 includes a drive plate 21, pulley system and lever arm that, when actuated, will convert linear motion to rotational motion that is then used to actuate an electrical generator. The system may be sized to fit within the sole, heel, toe box and/or other components of an article of footwear. The mechanism applications extend past use in the sole of a shoe.

The drive plate 21 is a movable member that is positioned to receive a heel of a person who is wearing the article of footwear within which the device 10 is incorporated. One or more springs 13 are positioned under the drive plate 21 and serve as biasing members that bias and urge the drive plate 21 upward to an upper stop position that corresponds to the relaxed position of the spring(s) 13. (For simplicity, this document may refer to "one or more springs" using the plural term below.) One or more side support plates 15 may be positioned along one or more sides of the drive plate to limit or prevent horizontal (side-to-side) movement of the drive plate 21. As shown, a drive link 18 may be positioned under a generally central area of the drive plate 21 when the drive plate is in the upper position. The springs 13 may be positioned under a first end area of the drive plate 21.

Figure 2A:
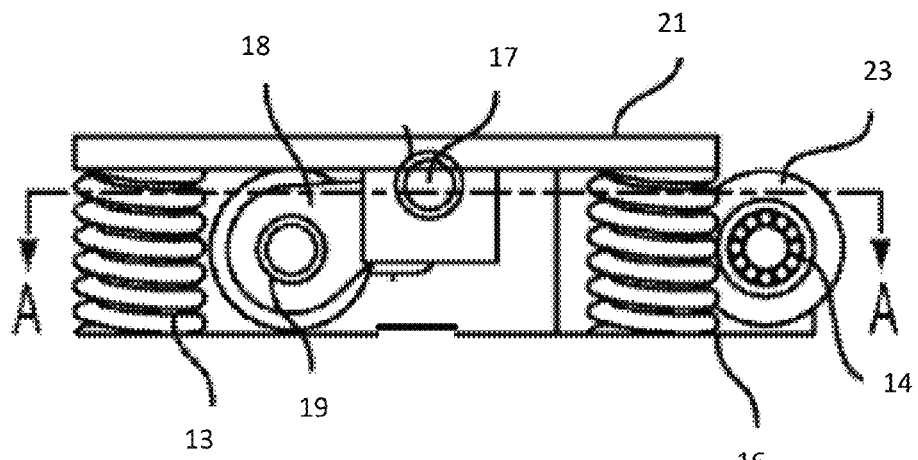
FIGS. 2A and 2B illustrate additional elements of certain components of the device of FIG. 1.
Figure 2B:
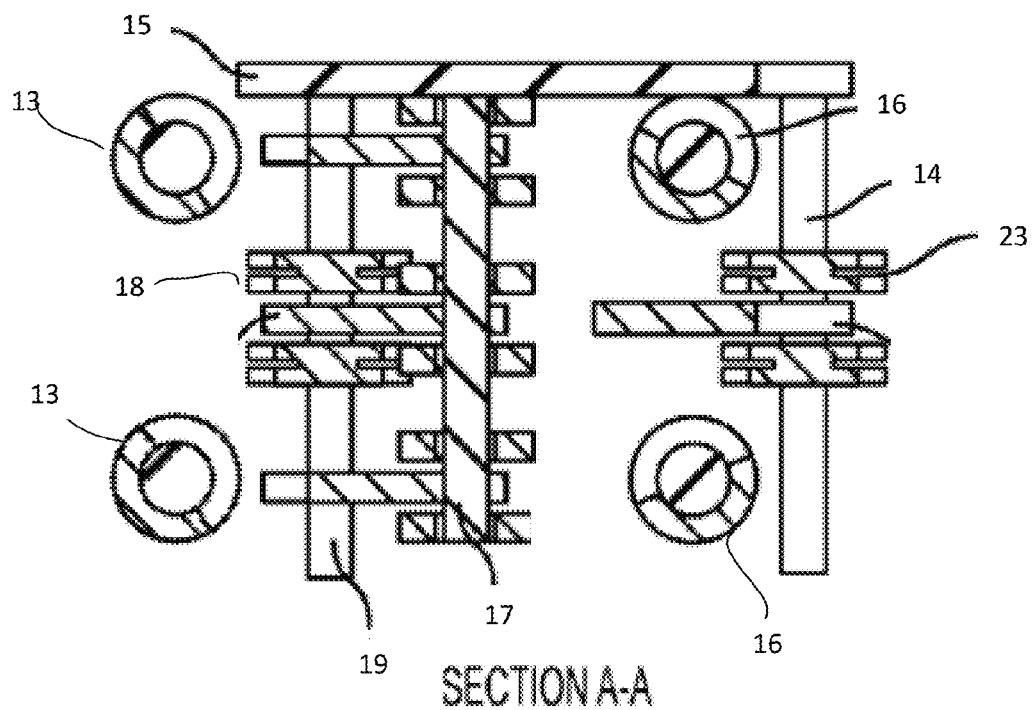

When a person steps on the device 10, at least a portion of the drive plate 21 moves downward and the springs 13 are compressed. The drive plate 21 serves as an actuating member that moves from the stop (upper) position to a compressed (lower) position that is closer to the base 26 than the stop position of the drive plate 21 is to the base 26. In the embodiment of FIGS. 1A-1C, a first end of the drive plate 21 that is over the springs 13 will move downward, while the second end of the drive plate (i.e., the end that is on the side opposite the springs) will remain in an upper position. Optionally, the second end may be supported by an axle, pin or other structure 16. For example, as illustrated in FIG. 2A, the second end may also be supported by one or more springs having different tensile properties than the springs 13 at the first end. In this way, when the drive plate 21 moves downward toward the base 26, the drive plate urges the drive link 18 to move away from the springs 13 in a direction that is generally parallel to the base 26 and orthogonal to the direction of compression of the springs 13 and/or the direction of movement of the drive plate 21. Thus, the drive plate 21 and drive link 18 are mechanically interconnected. The drive plate 21 as shown is positioned to be parallel to the base 26, although this is not a requirement. In some embodiments, the drive plate 21 may be positioned at an angle with respect to the base 26.

For example, referring to FIGS. 1A-1C and 2A-2B, when a heel strikes the drive plate 21 over the springs 13, the drive link 18 may move from a first position further away from the springs 13 to a second position located near (or relatively closer to) the springs 13. The first location of the drive link 18 is its position when the drive plate 21 is in the upper position. The drive link 18 moves to a second location, near the springs 13 (i.e., toward the left in FIG. 1B), when the drive plate 21 is depressed. The drive link 18 may be a wheel, a sliding structure, a sphere, a cylinder, or any other member that can be moved from a first position to a second position. In addition or alternatively, the drive link 18 may angularly pivot about a shaft 17 in response to movement of the drive plate 21 from its upper position to the lower position. The system also may include a second biasing member 16 that urges the drive link 18 back to the first position as the drive plate 12 moves toward its upper position. The second biasing member may be, for example, a spring, an elastic cable, or other member that is attached to a drive link shaft 17 or other components and that pushes or pulls the drive link 18 back to the first position.

The drive link 18 and/or the drive link shaft 17 are connected to a pulley system. The pulley system includes a primary pulley shaft 19, a secondary pulley shaft 14, a connecting cable 25 and one or more cable pulleys 23. When the pulley system's cable is moved, the cable causes one or more lever arms 22 to move. Each arm 22 is connected to a gear train 17 and moves between a first and second position. The cable 25 is directly or indirectly secured to the drive link 18 or drive link shaft 17 and thus enables movement of the drive link 18 to cause movement of each arm 22.

The arm(s) 22 are connected to the gear train 27, and this movement of the arms causes movement of the gear train 27. The system also includes an electric generator with at least one armature 32 that is rotatably mounted in a stator. The gear train 27 may include a first gear 28 having a shaft that is connected to an arm 22, a second gear 12 having a shaft that is connected to the armature 32, and any number of additional gears. Movement of the first gear 28 may cause angular movement of the second gear 12 in response to movement of the drive link 18. Optionally, the movement of the first gear 28 may correspond to greater angular movement of the second gear 12. When the arms 22 move from a first position to the second position, and then back from the second position to the first position, the angular directions of rotation of a corresponding armature 32 may be the same for each arm movement or may be opposite for each arm movement. Thus, the generator may be activated in response to travel of the drive link 18 from the first position to the second position, and/or from the second position to the first position.

When the arm(s) 22 turn the gear train 27, the gear train is connected to the armature 32 and thus causes the armature to rotate. The rotation of the armature 32 in the stator generates electric current. The system also may include an AC-to-DC conversion circuit, such as a system of rectifiers and amplifiers that convert to generated current from AC into DC before the energy is stored in a rechargeable battery.

The device 10 generates power during two phases: when the user presses his or her foot down in a step, and when the user picks his or her foot up in the step. The first is described above as the "stepping phase" and compression of the drive plate 21. During the second phase, when the user lifts his or her foot, the user removes pressure from the drive plate 21, causing the system components to return to their initial positions. One or more reset springs 24 serve as tension springs that connect the arms 22 to the base 26. Movement of the arms from their first position to their second position will load the reset springs 24 as the drive plate 21 moves to the lower position. When the drive plate 21 returns from the lower position to the upper (stop) position, the reset springs 24 return to their first position and push the electric generator in the opposite direction, and support spring(s) 13 push the drive plate 21 upwards. The motion ensures that the cable 25 remains taught. Thus, the system may generate energy throughout each stage of person's typical walking pattern.

The base plate 26 and a center support plate outline the area of the mechanism and support all components. The size and shape of the base plate 26 may vary based on the particular application or size of the wearer's shoe. The system components may be provided in a casing that fits within a profile of an orthotic insert, and which can be embedded within an insert or shoe sole. A mechanically drivable energy converter may be secured to the casing and connected to an electrical storage device. Alternatively or in addition, a storage battery may be electrically connected to the generator to store electrical energy in response to activation of the generator.

Figure 3A:
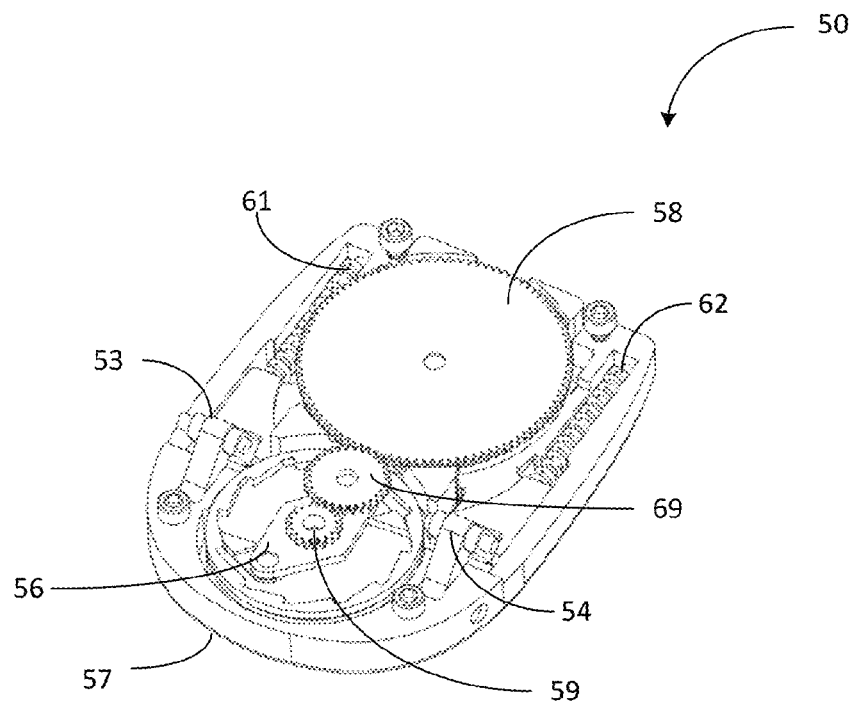
FIGS. 3A and 3B illustrate various views of a second embodiment of a foot-powered energy generation device.
Figure 3B:
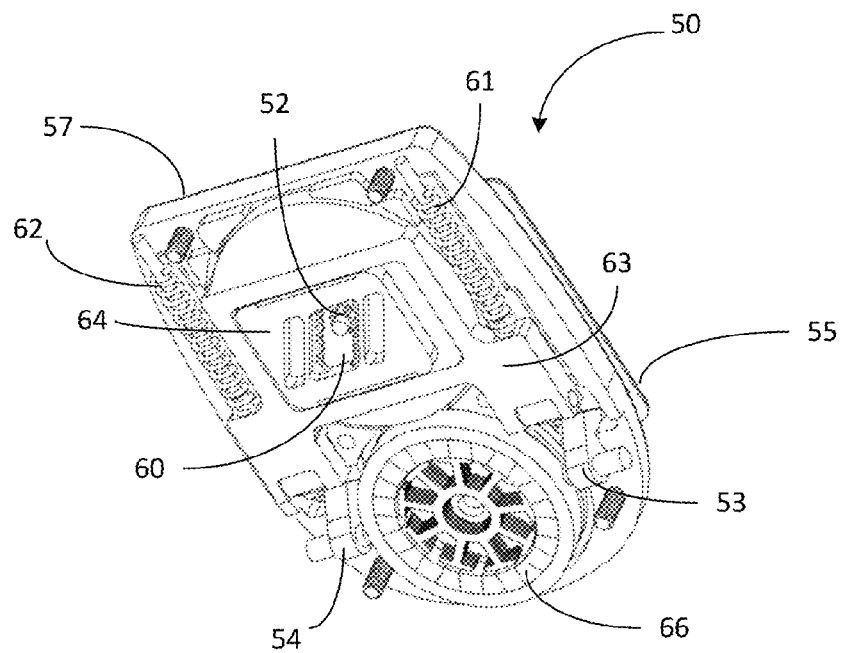

FIGS. 3A and 3B illustrate an alternate embodiment of a foot-powered energy generator 50. FIG. 3A illustrates a perspective view of the "top" of the device (the top being the surface onto which a user will place his or her foot), while FIG. 3B illustrates a perspective view of the "bottom," i.e., the lower surface that includes the base 57 of a housing of the device. The illustrations of FIGS. 3A and 3B do not show all components of the device's housing so that certain interior components may be shown and described here. Although designated as "top" and "bottom" for the purpose of discussion, the embodiments shown in FIGS. 3A, 3B, and other figures may be used in either direction. A housing may or may not be used in practice. The device 50 is sized to fit within at least a heel portion of an article of footwear, prosthetic foot or insole. Thus, as shown the device's base 57 optionally may be curved to correspond to the shape of a heel of an item of footwear.

The top portion of the device's housing includes a moveable step plate 55 that is supported at least in part by one or more linkages 53, 54 that are mechanically interconnected to a carriage 63. Thus, the step plate 55 is also mechanically interconnected to the carriage 63. The step plate 55 is not shown in FIG. 3A so that features underneath it may be seen, but step plate 55 is illustrated in FIG. 3B. The linkages 53, 54, which may be semi-rigid, resilient members such as leaf springs, carriage springs and the like that are directly or indirectly connected to the primary carriage 63, either at all times or only when moved by the step plate 55. When a person applies pressure to the step plate 55 by stepping downward, the step plate will move downward and cause the linkage(s) 53, 54 to move in a direction that urges the primary carriage away from a first position (i.e., its original or rest position) in a direction that is parallel to the base 57. For example, the carriage 63 may move away from the heel portion of the base toward a second or extended position when the step plate 55 is depressed by a user stepping downward onto the device.

Although the illustrations show the step plate as being at the top of the device, in various embodiments it may be positioned near the bottom or at an interior location, so long as it moves in a direction that causes the carriage to move when the wearer applies pressure to the plate.

When the user picks up his or her foot and thus releases pressure from the step plate 55, the linkages 53, 54 or other tensile members will urge the step plate 55 back to an upward position, and one or more reset springs 61, 62 may push the carriage back to its first position. The reset spring(s) 61, 62 as shown are positioned between the primary carriage and the non-heel portion of the device and are thus compressed when the carriage 63 moves to the second position. In an alternate embodiment, reset spring(s) 61, 62 may be mechanically connected to the primary carriage and a heel portion of the device's housing so that they extend when the carriage 63 moves to the second position. Either way, when the spring(s) 61, 62 return to a position of rest, the carriage 63 will return to its first position. In an additional embodiment, when the linkages 53, 54 are leaf springs, the leaf springs may provide reset function and pull the carriage back to its first position when pressure is released from the step plate 55. When this happens, both the reset springs 61, 62 and the leaf springs 53, 54 may urge the carriage back to its first position, or the reset springs 61, 62 may not be required at all and may be omitted.

FIG. 3B illustrates that the carriage 63 may include or be mechanically interconnected to a unidirectional motion component 64. The unidirectional motion component 64 is a structure that is capable of moving in at least two directions, and which is also mechanically interconnected to one or more gears of a gear train so that when the unidirectional motion component 64 moves in any of its configured directions, the connected gears will also turn. As shown in FIG. 3B, the unidirectional motion component 64 may include an opening 60 with two sides that are positioned at an angle that is not parallel to that of the direction of motion of the carriage. For example, the angle may be approximately 45 degrees, or between about 30 degrees and about 60 degrees, or between about 15 degrees and about 75 degrees. Other angles are possible. Each side of the opening 60 may include teeth that are sized and positioned to engage the teeth of a first gear 52 of the gear train, which as shown may be a planetary gear. The teeth may be of the first gear 52 itself or of an axle that is integral with the gear as shown in FIG. 3B. As shown the first gear 52 may be a planetary gear that rotates about the same axis as that of a second gear 58. Alternatively, instead of teeth, the opening 60, first gear 52 and/or second gear 58 may be made of or coated with a non-smooth surface so that the opening may move the gear by friction. (In this description, when terms such as "first," "second" "final" and the like are used to refer to gears, they do not necessarily require the gear to be first or final in a sequence of gears. Rather, the terms are merely used to distinguish the gears and define their positions relative to each other in a turning sequence.)

The opening 60 is wider than the engaged component of the first gear 58 so that both sides of the opening 60 will not engage the gear at the same time. Thus, when the carriage 63 moves in a first direction away from the heel, a first side of the opening 60 will engage the first gear 52 and cause the first gear 52 to rotate in a first direction (i.e., clockwise or counterclockwise). Because of the unidirectional motion component 64, when the carriage moves in the opposite direction to return toward the heel, the opposite side of the opening 60 of the unidirectional motion component will engage the first gear 52 and cause the first gear 52 to rotate in the same direction. Thus, the carriage 63 serves as a continuous drive train for the first gear 52 as it ensures that the first gear 52 continues to turn in a single direction as the carriage 63 moves back and forth while the wearer walks, runs or otherwise repeatedly places pressure on and removes pressure from the top of the device.

In an alternative embodiment, the carriage 63 may include or simply be one or more linear gear bars that engage the circular first gear 52 in a rack and pinion arrangement in which the gear bar(s) of the carriage are the rack and the first gear 52 is the pinion. In this embodiment, a pair of gear bars may be angled and positioned to correspond to the location of the opening 60 of the carriage 63 as shown in FIG. 3B so that the first gear 52 will rotate in a single direction of rotation during each phase of the user's stepping motion. Alternatively, a single gear bar may move in a direction that is parallel to that of the base, such as from heel to toe when pressure is applied to the drive plate and from toe to heel when pressure is released from the drive plate (or vice versa). In this way, the gear bar may cause the first gear to alternatively rotate in the clockwise and counterclockwise directions at any time when the user's foot moves upward or downward on the drive plate. Alternatively, a clutch may release the gear bar from the first gear on one of the strokes and engage the gear bar with the first gear on the other stroke so that the first gear alternates between a single direction turn and a neutral position.

The first gear 52, when rotated, may engage and rotate a final gear 59, optionally via one or more intermediary gears 69. The final gear 59 may be connected to a generator 66 so that the center of the final gear revolves around the same axis as that around which the center of the rotor of the generator 66 revolves as shown. Optionally, instead of or in addition to sharing an axis of rotation with the generator 66, the final gear 59 may be integral with the rotor of the generator 66. As another alternative, the generator 66 may be a radial generator with teeth that interact with the final gear 59 instead of connected to the final gear via an axle. In various embodiments, final gear 59 may be a planetary gear system or a smaller gear that engages the rotor in a stacked or non-stacked arrangement, either directly such as in a rack and pinion arrangement or indirectly via one or more other components. Such an embodiment will be discussed in more detail below in the text relating to FIG. 9. In any of these embodiments, the gears serve as a gear train that will drive the generator 66. The gear train may be positioned along a plane that is parallel to that of the base so that the when the step plate 55 moves up and down under the wearer's heel, rotational motion is transferred to the final gear 59 and generator 66, which may be generally positioned in an instep area of the footwear item, or otherwise closer than the first gear is to the toe box of the footwear item.

In embodiments that have a final gear 59, the final gear 59 may have a diameter that is smaller than that of the second gear 58 and/or intermediary gear(s) 69 as shown. For example, the turning ratio of the final gear to the first gear may be approximately 30:1, approximately 40:1, or greater. In embodiments in which first gear 59 is not a planetary gear, smaller gear ratios such as approximately 20:1 may be implemented. Other ratios are possible. AC power generated by the generator may be transferred to an external battery via one or more power ports to which one or more electrical conductors may be connected.

Optionally, any gear in the system also may be connected to a clutch 56 that is configured to engage the connected gear (in the example shown, final gear 59) with the rest of the gear train only when the first gear is rotating according to at least a minimum speed. If the speed (e.g., rotations per minute or rotations per second, etc.) is lower than the threshold, the clutch 56 may disengage the connected gear from the other gears in the gear train. For example, disengagement may occur by the clutch 56 moving the final gear 59 in a lateral direction away from the first gear 52 (e.g., toward the toe), and engagement may occur by the clutch 56 moving the final gear 59 in a lateral direction toward the first gear 52 or the intermediary gear 69. Alternatively, the clutch 56 may be configured to engage and disengage the unidirectional motion component 64 with the first gear 52, such as by moving either the first gear 52 or the unidirectional motion component 64 up or down. In this alternative, the clutch may be configured to (i) engage the unidirectional motion component 64 with the first gear 52 when the speed of motion of the carriage, the speed of motion of the step plate, or pressure applied to the step plate exceeds a threshold; and (ii) disengage the unidirectional motion component 64 from the first gear 52 when the speed of motion of the carriage, the speed of motion of the step plate, or pressure applied to the step plate does not exceed the threshold. The clutch may be embodied in a suitable clutch mechanism, such as a multiple plate clutch, a one way bearing (e.g., a roller clutch or sprag clutch), or other types of clutches.

The generator 66 may be a radial generator as shown in FIG. 3B, or the system may incorporate other permanent magnet generators or other types of generators. For example, the system may incorporate a permanent magnet generator that includes (i) a rotor that houses a set of magnets and (ii) a stator that holds stationary coils. The magnetic flux emitted from the magnets may move from pole to pole, and be arranged along the rotor such that the resulting magnetic field moves through the geometry of the coil, inducing a current.

Figures 4, 5:
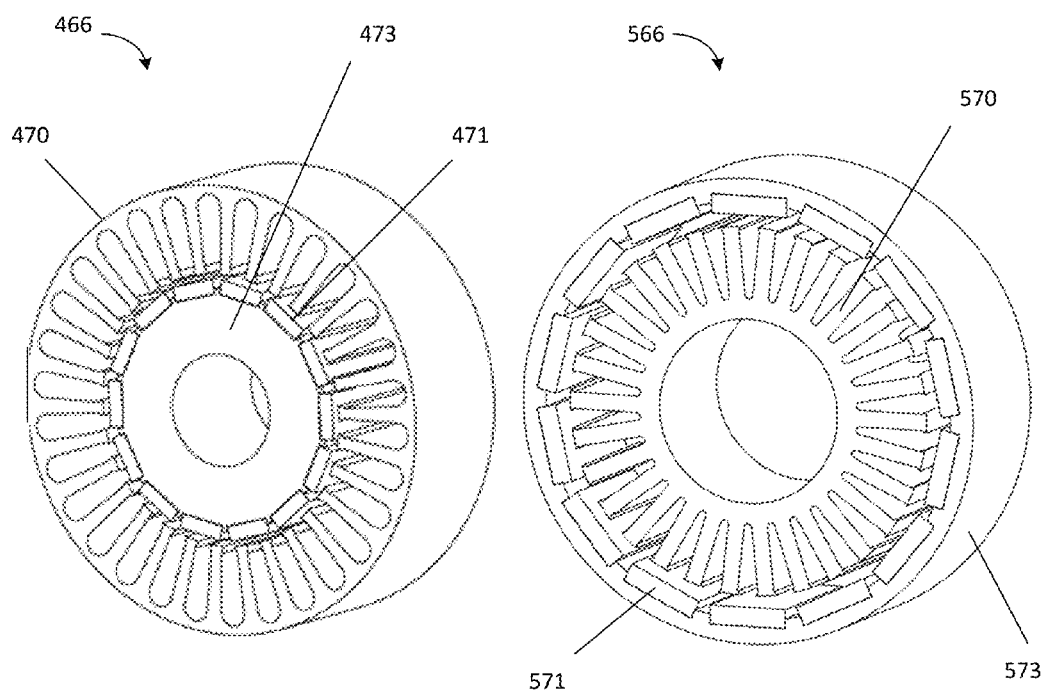
FIGS. 4 and 5 illustrate examples of radial generators that the device may include.

As an example, FIG. 4 illustrates an internal radial generator 466 in which the rotor 473, which includes a central hub and an external cylindrical sidewall comprising magnets 471 configured in a sequence of alternating polarity, is positioned inside of the stator 470 and acts as a drum that rotates within the stator 470. FIG. 5 illustrates an external radial generator 566 in which the rotor 573 is positioned outside of the stator 570 and thus surrounds the stator and acts as a drum that contains and rotates around the stator 570. In the external radial generator 566, the magnets 571 are positioned on an internal cylindrical sidewall of the rotor 473. In either embodiment, various components may be plastic, while others may be ferrous or other metallic structures. For example, the stators may be made of steel or other materials. Various types of magnets may be used, such as neodymium magnets.

In an alternate embodiment, an axial permanent magnet generator may be used to provide a lower (i.e., flatter) profile than a radial generator. FIGS. 6-8 illustrate examples. For example FIG. 6 illustrates a single axial permanent magnet generator 666 in which the rotor 673 is a disc having a circular surface on which a set of magnets 671 are arranged in a spoke fashion to extend from a central hub with alternating polarities. The rotor 673 faces the stator, and the stator 670 also has a central hub that is positioned along the same central axis as that of the rotor 673. FIG. 7 illustrates a double axial generator 766 in which the rotor 773 is positioned between two stators 770, 780 and rotates about central axis that the rotor shares in common with the stators. FIG. 8 illustrates a double axial generator 866 with stacked stators in which two stators 870, 880 are positioned adjacent to each other and between a pair of rotors 873, 883. The rotors 873, 883 rotate around a central axis that they share in common with the stacked stators 873, 883. In each of these embodiments, the stators may be coreless in that the coils may be embedded in a resin rather than fixed in place with steel.

Figure 9:
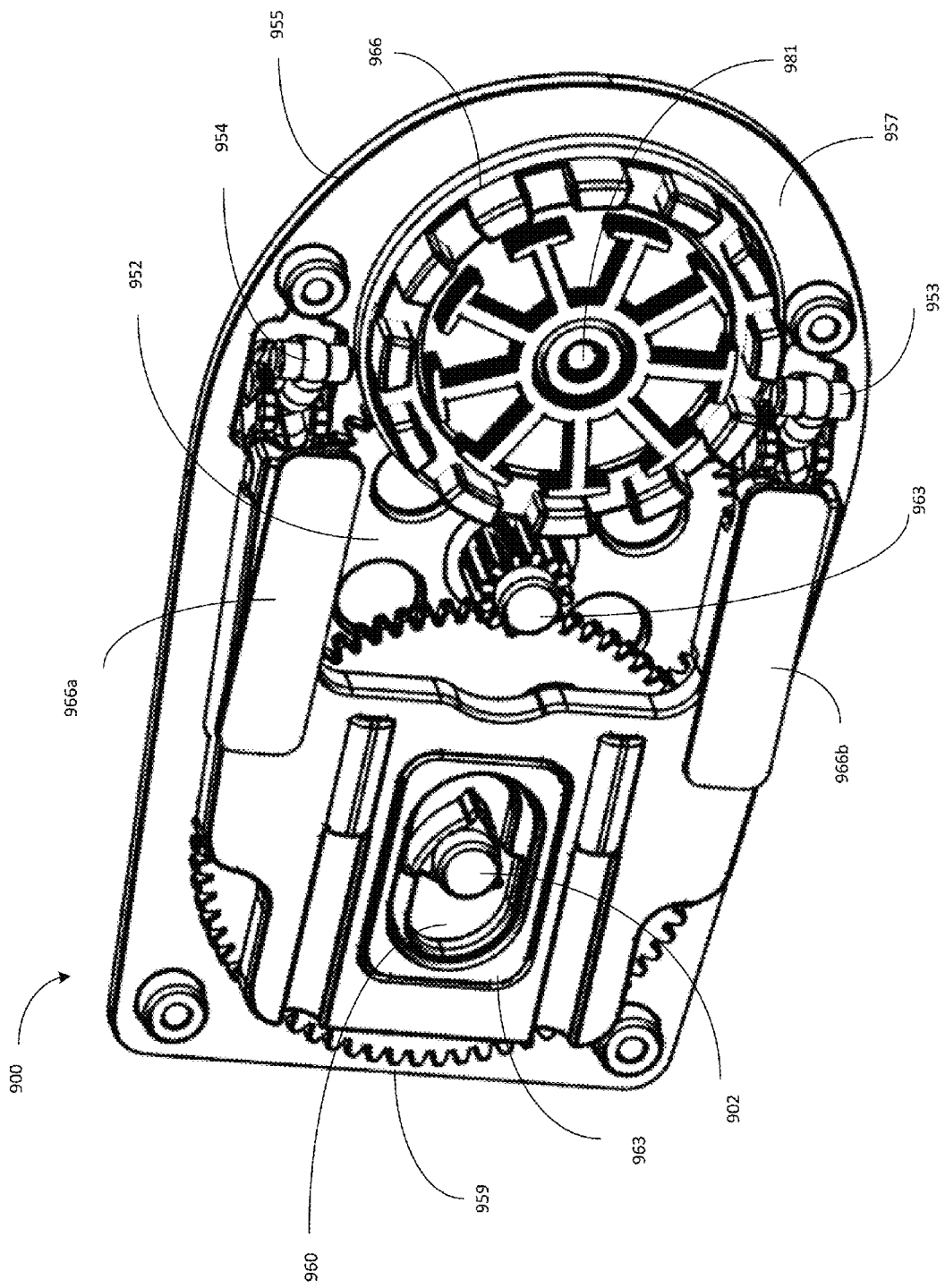
FIG. 9 illustrates a third embodiment of a foot-powered energy generation device.

FIG. 9 illustrates an embodiment in which the device 900 includes a gear train with no planetary gear, but instead a first gear 959 that engages a second gear 952, which in turn engages the rotor 981 of a generator 966. The first gear 959 includes an axle 902 that is configured to be turned in a single direction of rotation in response to movement of the carriage 963 in multiple directions. The axle 902 also may include prongs so that first gear 959 is a gear stack in which the axle 902 is one gear component of the stack. When the wearer steps down on the step plate(s) (not shown), one or more linkages 953, 954 such as springs under the step plate will push the carriage 960 to move in a first direction (e.g., away from the heel). As with other embodiments, the linkages 953, 954 may be semi-rigid resilient members such as leaf springs, carriage springs and the like. Various components may be supported by a base 955. Any number of step plates may be used in various embodiments. A base 957 supports the various components as shown. This and any other embodiment also may include one or more friction reducing pads 966a, 966b that are affixed to a top area of the device's housing (e.g., if 955 is a base instead of a step plate), a bottom area of the device's housing, or both. The friction reducing pads may be made of any suitable non-skid material, such as rubber, felt, an adhesive, various polymers and the like, any of which may have an anti-skid texture to help hold the device in place in the wearer's shoe.

Figure 10:
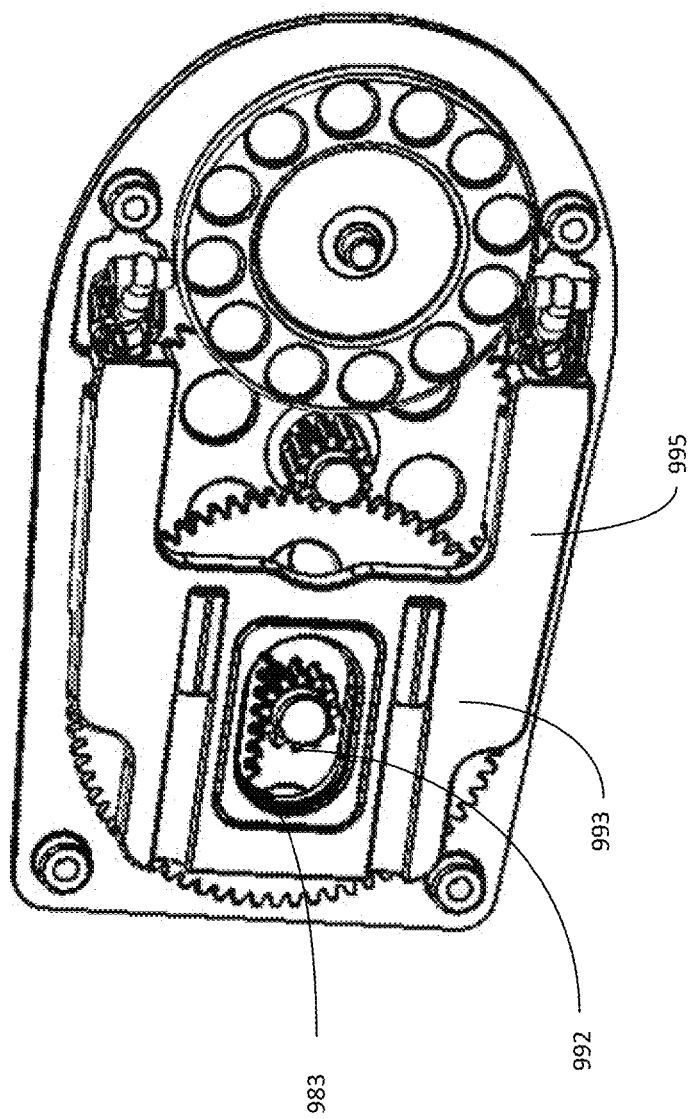
FIG. 10 illustrates a variation of the embodiment of FIG. 9 with a rack-and-pinion arrangement.

When the wearer steps up, the step plate(s) will rise and the resilient members will pull the carriage 963 in a second direction (e.g., toward the heel). The opening 960 of the carriage 963 includes a first section and an offset second section that provide two opposing ledges that engage prongs that extend from the axle 902. In this way, the carriage and axle together provide a unidirectional motion component configured to turn the gear 959 in a single direction of rotation, although this configuration is only shown by example. Other configurations can also turn the first gear in a single direction and are included within the scope of the invention. FIG. 10 illustrates an example of a rack and pinion arrangement in which the carriage opening is lined with a gear bar 983 that serves as a rack and the axle 992 serves as a pinion. In addition, FIG. 10 shows that one or more portions of the carriage 993/995 may serve as the step or drive plate so that a separate step plate is not needed. Such arrangements may be used in any of the embodiments described and shown in this document, and various components of other embodiments (such as a clutch) may be included in this embodiment. Indeed, any component of any embodiment shown in this document may be interchanged with components of other shown embodiments.

Returning to FIG. 9, when the first gear 959 turns, it will engage a component of the second gear 952, such as an axle 963 that is toothed so that the second gear 952 is a stack, of which the axle 953 is a component. The second gear 952, when turned, engages and turns the rotor 981 of the generator 966.

Figure 11:
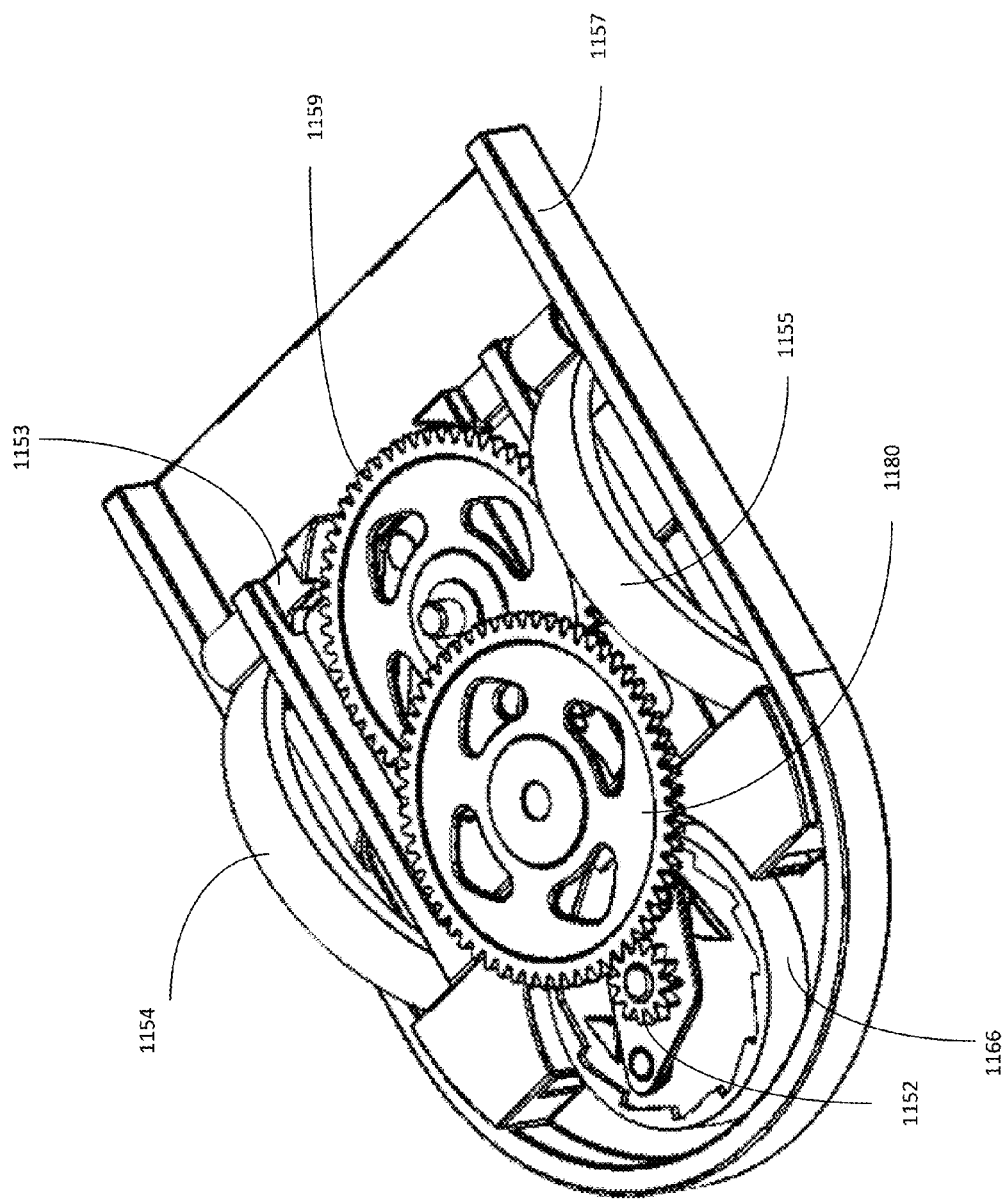
FIG. 11 illustrates a variation of the embodiment of FIG. 10 in which an alternative linkage is shown.

FIG. 11 illustrates an alternate embodiment in which the carriage 1153 is positioned above the base 1157 and under the gear train. The linkages 1154, 1155 in this embodiment are semi-circular resilient members or leaf springs. The upper surface of each linkage may be under a step plate, or the upper surface of the linkage itself may serve as the step plate. When a person steps on the device, the linkages 1154, 1155 and their corresponding step plate(s) compress into a lower position and move the carriage 1153 away from the heel. When the person raises his or her foot the linkages 1154, 1155 decompress, return to an upper position, and move the carriage 1153 back toward the heel. Both movements cause the first gear 1159 to rotate. The first gear 1159 engages and rotates a second or final gear 1152, which directly or indirectly engages the rotor of the generator 1166, optionally via one or more components such as a hub or any number of intermediary gears 1180. The final gear 1152 turns the rotor of the generator 1166. The arrangements of FIG. 11 may be used in any of the embodiments described and shown in this document, and various components of other embodiments (such as a clutch) may be included in this embodiment.

Figure 12:
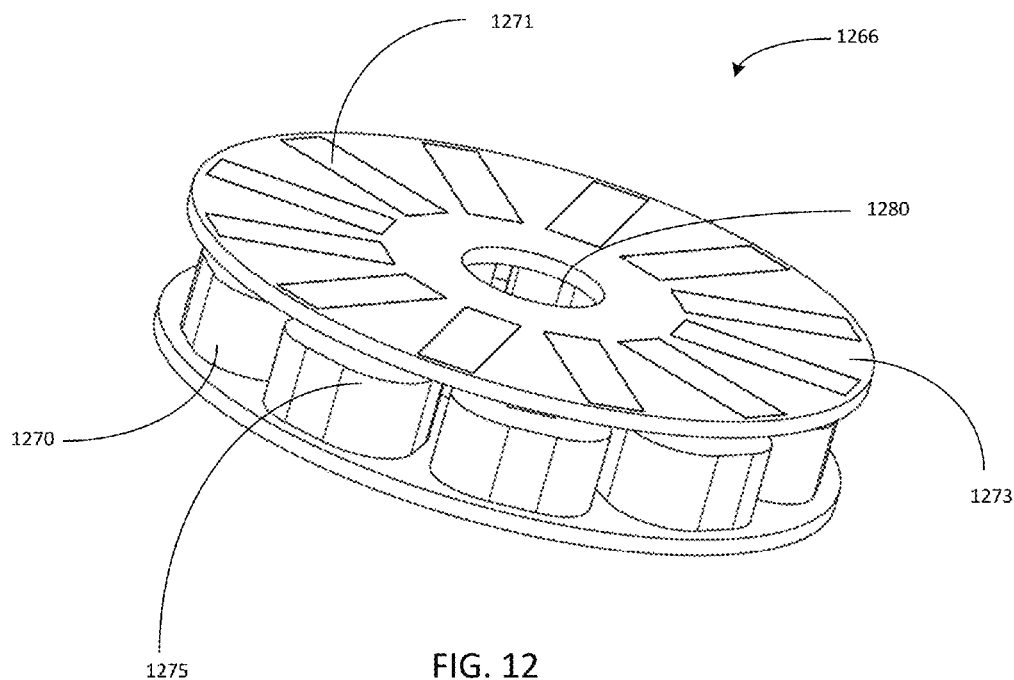
FIGS. 12 and 13 illustrate additional examples of generators that the system may include.

FIG. 12 illustrates an axial generator embodiment of the generator 1266 that includes a stator 1270 and a rotor 1273, each of which are configured as circular plates of substantially equal diameter. The rotor includes a set of magnets 1271 positioned around the rotor, optionally positioned as spokes extending from a central hub 1280. The stator and rotor are stacked, with a set of coils 1275 positioned between the stator and rotor. The coils 1275 may be arranged on the stator in a circle around the hub 1280. The hub may include an extending member (981 in FIG. 9) that will engage the gear train and the rotor and thus turn the rotor in response to rotation of the gear train. Other axial generator configurations are possible.

Figure 13:
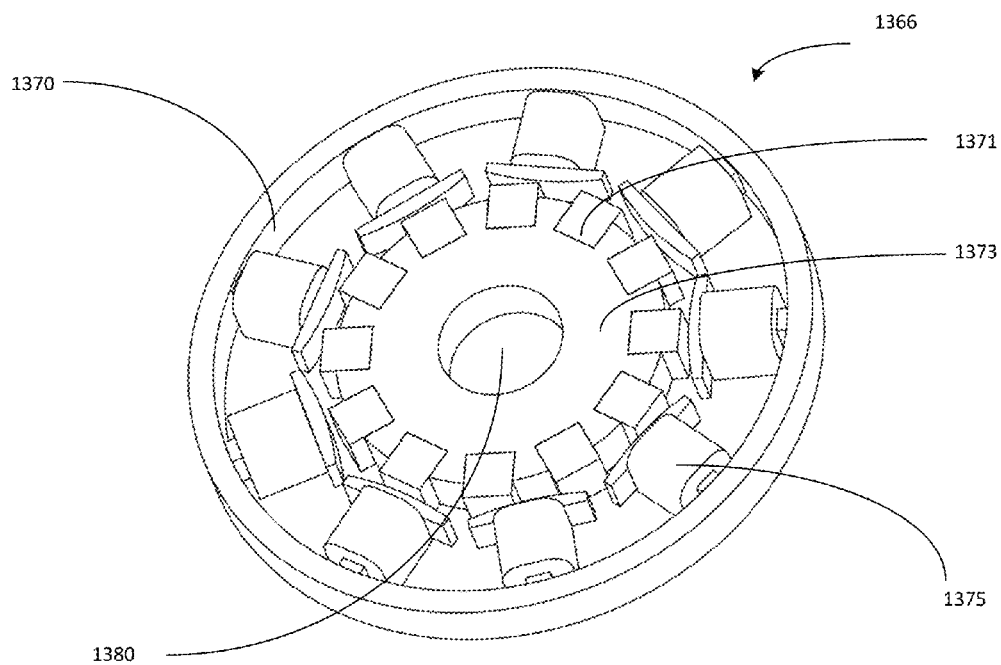
Figure 14A:
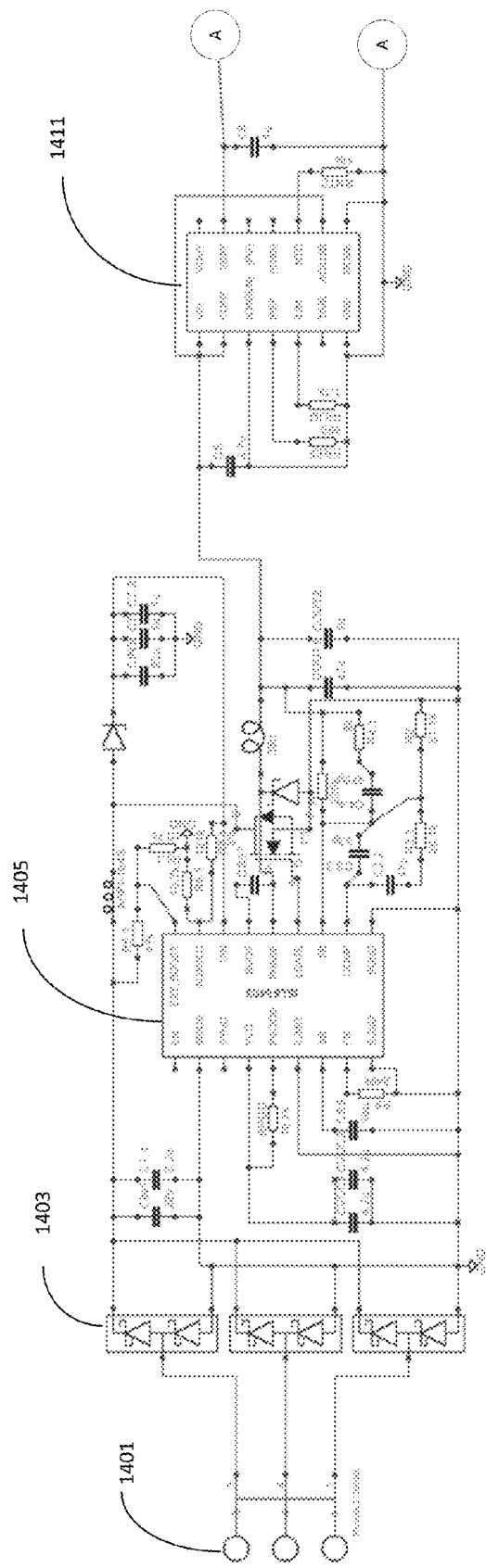
FIGS. 14A and 14B illustrate an example of an electronic circuit that may convert the generation device's AC output to DC, and also regulate the delivery of DC to an external battery.
Figure 14B:
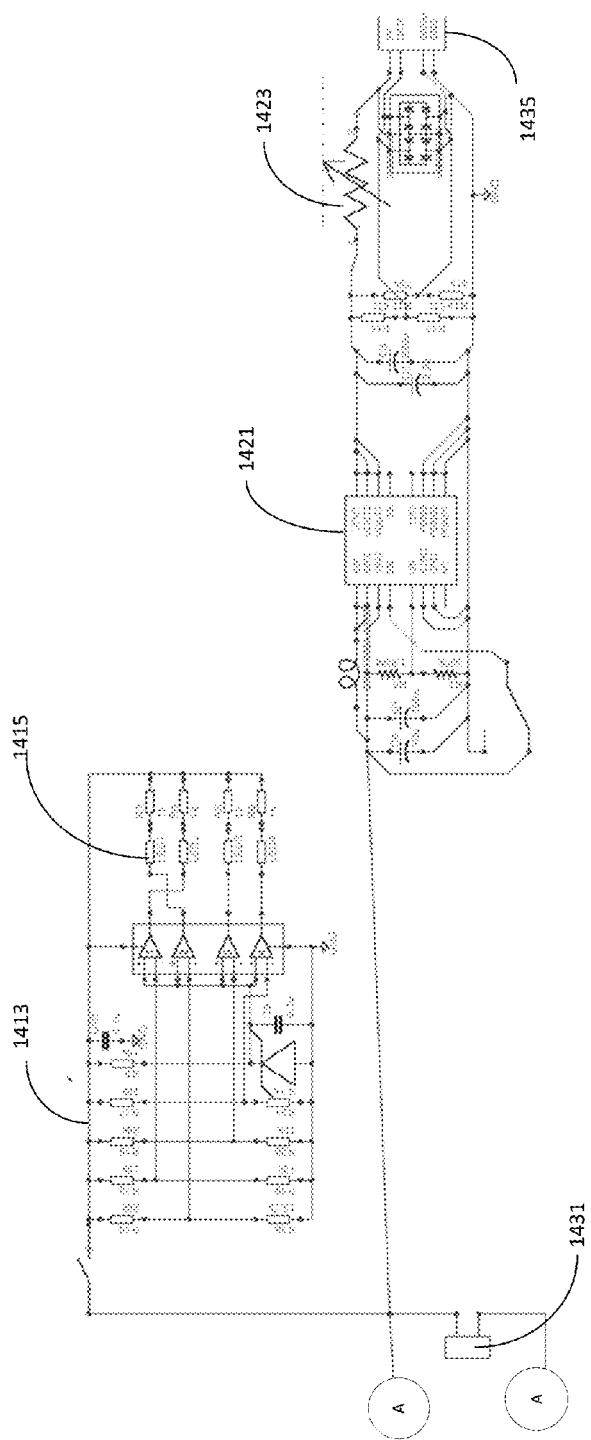

FIG. 13 illustrates a radial generator embodiment in which the generator 1366 includes a circular rotor 1370 and a circular stator 1373, in which the stator 1373 is positioned within the rotor and each share a common central hub 1380. The rotor includes a set of magnets 1371 positioned around the rotor's circumference, optionally positioned as spokes extending from the central hub 1380. A set of coils 1375 positioned around an inner wall of the rotor 1370, optionally as spokes extending inward toward the stator. The hub may include an extending member (e.g., 981 in FIG. 9) that will engage the gear train and the rotor and thus turn the rotor in response to rotation of the gear train. Other radial generator configurations are possible The systems of any of these embodiments also may include an AC-to-DC conversion circuit, such as a system of rectifiers and amplifiers that convert to generated current from AC into DC before the energy is stored in a rechargeable battery. FIGS. 14A and 14B are a circuit diagram of various example components of a charging circuit that may be included in a battery unit. The circuit receives power via a set of contacts 1401 that are connected to the generator via one or more conductive elements. A full bridge rectifier 1403 converts the input alternating current (AC) to direct current (DC).

The voltage of the rectifier 1403 output may not be sufficient to charge an energy storage device, and it may be susceptible to power spikes during operation. To address this, a first regulating circuit 1405 may receive the rectifier output and regulate its voltage to a level corresponding to that of the energy storage device's rated input voltage. The regulating circuit 1405 may increase the voltage from the rectifier when necessary, reduces voltage during spikes, or both. In some embodiments, the first regulating circuit may be a buck-boost converter. For example, when used with certain lithium polymer (LiPo) batteries, the regulating circuit may include a buck-boost converter that yields a regulated output voltage in a range of approximately 3.7 volts to approximately 4.2 volts. Other voltage ratings and ranges are possible, typically depending on the rating of the battery that is used with the system.

During a charging operation, the output of the first regulating circuit may lead to a charging circuit 1411 that may be configured to regulate the delivery of current to an external battery 1431. When the charging circuit 1411, which as shown is an integrated circuit such as those known now or in the future to persons of skill in the art, detects that the battery unit voltage is less than a threshold level, it may reduce the charging current delivered to the battery 1431, and it may increase the current when the voltage rises to at least the threshold. These thresholds may be set by one or more external resistors. When the charging circuit 1411 detects that the battery 1431 is fully charged or within a threshold amount of being fully charged, the charging circuit 1411 may switch to an end of charge condition and reduce or stop delivering charge to the battery 1431. The charging circuit 1411 also may include outputs for interfacing with LEDs 1415 or other indicators that provide a visual indicator when the device is charging a battery.

During a discharging operation, power from the battery 1431 may pass through a second regulating circuit 1421 that regulates the voltage of the level that is required for a load 1435, such as a mobile electronic device or device battery that is being charged. In some embodiments, the second regulating circuit 1421 may include a boost circuit that regulates a charge to remain above a threshold level, a buck circuit that regulates a charge to remain below a threshold level, or a buck/boost converter that regulates a charge to remain within an upper and a lower threshold. The load 1435 may be connected to the battery unit via an electrical connector such as a Universal Serial Bus (USB), mini-USB, micro-USB, Lightning or other connector. The circuit also may include a shock overcurrent and electrostatic discharge protection circuit 1423, such as a variable resistor in combination with a filter as shown, to provide an additional level of protection during extreme electrical events.

In various embodiments, the overall profile of the device is small enough to fit comfortably within an insole, sole, or heel of an article of footwear. For example, the device may have a longest dimension (from heel area to toe or instep area) of about 3.1 inches, and widest width dimension that is no more than 2.5 inches. The uncompressed height of the device may be no more than 0.5 inches. Other sizes are possible. Optionally, the step plate may be separate from the device's housing, and/or the step plate may form part of the sole or insole. Other configurations are possible.

Figure 15:
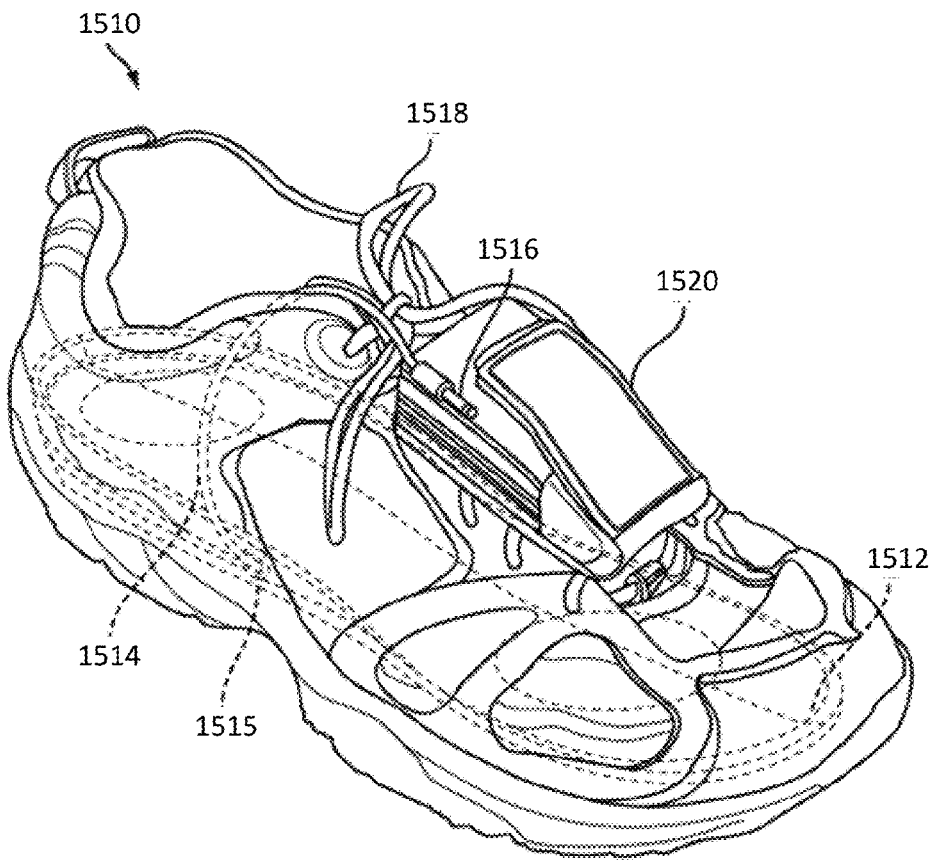
FIG. 15 illustrates an example shoe having an energy generation device incorporated within or under the shoe's insole.

FIG. 15 illustrates an example shoe 1510 having an energy generation mechanism embedded within or under the shoe's insole 1512. The energy generation mechanism may be one such as those described above, or variations of such a mechanism, that generate energy in response to being activated by a human stepping action. The energy generation mechanism may be embedded within the insole as shown, or within another component of the shoe, such as the sole. When this document uses the term "shoe," it is intended to generally refer to any item of footwear, including but not limited to a shoe, boot, sandal, sock or other footwear item.

A power cord 1514 leads from the energy generation mechanism via a port 1515 in the insole 1512 or other shoe component to an energy storage unit 1520. The port 1515 will be configured to receive the power cord 1514 and direct power generated by the energy generating device to the power cord 1514 for transfer to an energy storage device such as a battery. For example, the port may include one or more terminals, pins, or other structures that are configured to receive and interconnect with the power cord.

The power cord 1514 may be equipped with a plug 1516 so that it may be removed from the storage unit 1520. In various embodiments, the power cord 1514 may include one or more conductors surrounded by an insulating material. The cord is a conductor and may be round, oval shaped, or in some embodiments shaped so that a side of the cord having a widest dimension abuts the wearer's foot while a side having a shorter dimension extends away from the foot. This relatively flat shape may result in more comfort for the user within the shoe. In addition, the port 1515 may be positioned on a side of the insole in a location between the heel area and the ball of the wearer's foot, and in some embodiments under the instep and/or in the area of the medial arches of the wearer's foot. In this way, the wire may extend upward from the insole in a location that is in proximate and in front of the ball of the wearer's ankle (i.e., the medial malleolus or the lateral malleolus) so that the wire does not cause discomfort to the wearer. Other locations are possible.

The power storage unit 1520 may include features that enable it to be removably attached to a shoelace 1518 or other component of the shoe 1510. Alternatively, the power storage device 1520 may be removably attached to another portion of the shoe, or to a separate structure such as wearable securing band. As another alternative, the cord 1514 may be long enough to permit the power storage device 1520 to be placed within a pocket of, or otherwise attached to, another article of clothing such as pants, shorts, a belt, a jacket, or the like.

The various components of the energy generation device may be made of metals, metallic alloys, composites, rubber, or plastics. For example, one embodiment may use aluminum for the base and drive plates, axles, and lever arms, while other parts may be made of plastic.

The features and function described above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A foot-powered energy generation device, comprising:
a base configured to fit within a footwear item;
a step plate having an upper position and a lower position;
a generator comprising a rotor;
a gear train comprising a first gear and a second gear that are configured so that rotation of the first gear will cause the second gear to rotate, and rotation of the second gear will cause the rotor to rotate; and
a carriage that is mechanically interconnected to the step plate and the first gear so that the carriage will cause the first gear to rotate in response to movement of the step plate between the upper position and the lower position;
wherein:
the second gear comprises a planetary gear having a center, and
the device also comprises an axis about which the center of the planetary gear and a center of the rotor both rotate.

2. The device of claim 1, further comprising:
a linkage that mechanically interconnects the step plate to the carriage so that:
when pressure is applied to the step plate so that the step plate moves toward the lower position, the linkage will cause the carriage to move in a first direction away from a first position, and
when pressure is released from the step plate so that the step plate moves up toward the upper position, the linkage will cause the carriage to return to the first position.

3. The device of claim 2, wherein the linkage comprises a spring that is also configured to return the step plate to the upper position when pressure is released from the step plate.

4. The device of claim 1, wherein:
the carriage comprises an opening configured to receive and engage the first gear;
the opening comprises opposing first and second sides and a lateral dimension between the first and sides, wherein the lateral dimension is larger than a diameter of the first gear so that:
when the carriage moves in a first direction away from a first position, the first side of the opening will engage the first gear and cause the first gear to rotate in a direction of rotation, and
when the carriage moves in a second direction to return to the first position, the second side of the opening will engage the first gear and cause the first gear to rotate in the direction of rotation.

5. The device of claim 1, further comprising a clutch that is configured to engage the carriage with the gear train and disengage the carriage from the gear train.

6. The device of claim 1, further comprising a clutch that is configured to
cause the first gear to be engaged with the second gear when a speed of rotation of the first gear exceeds a threshold; and
cause the first gear to be disengaged from the second gear when the speed of rotation of the first gear does not exceed the threshold.

7. The device of claim 1, wherein the generator comprises a radial permanent magnet generator or an axial permanent magnet generator.

8. The device of claim 1, wherein:
the gear train also comprises at least one intermediary gear that is positioned and configured to mechanically interconnect the first gear to the planetary gear; and
the gear train is configured so that each gear in the gear train is positioned along a plane that is substantially parallel to the base.

9. The device of claim 1, further comprising the footwear item, and wherein the footwear item comprises an insole or a heel.

10. The device of claim 1, wherein the step plate comprises a surface of a linkage that mechanically interconnects the step plate to the carriage so that:
when pressure is applied to the linkage so that the linkage is compressed, the linkage will cause the carriage to move in a first direction away from a first position, and
when pressure is released from the step plate so that the step plate moves up toward the upper position, the linkage will cause the carriage to return to the first position.

11. A footwear item having energy generating capability, comprising:
a housing that is configured to be worn on a foot, comprising:
a step plate having an upper position and a lower position,
an electrical generator comprising a rotor,
a gear train that is engaged with the rotor so that rotation of at least a portion of the gear train will cause the rotor to rotate, and
a carriage that is mechanically interconnected to the step plate and the gear train so that the carriage will cause components of the gear train to rotate in response to movement of the step plate between the upper position and the lower position;
wherein:
the gear train comprises a planetary gear having a center; and
the footwear item also comprises an axis about which the center of the planetary gear and a center of the rotor both rotate.

12. The footwear item of claim 11, wherein the wearable housing comprises an insole, a heel or a sole.

13. The footwear item of claim 11, further comprising:
a linkage that mechanically interconnects the step plate to the carriage so that:
when pressure is applied to the step plate so that the step plate moves toward the lower position, the linkage will cause the carriage to move in a first direction, and
when pressure is released from the step plate, the step plate moves up toward the upper position, and the linkage will cause the carriage to return to the second position.

14. The footwear item of claim 13, wherein the linkage comprises a spring that is also configured to move the step plate toward the upper position when pressure is released from the step plate.

15. The footwear item of claim 11, wherein:
the carriage comprises an opening configured to receive and engage a first gear of the gear train;
the opening is configured to receive the first gear and comprises opposing first and second sides and a lateral dimension between the first and sides, wherein the lateral dimension is larger than a diameter of the first gear so that:
when the carriage moves in a first direction away from a first position, the first side of the opening will engage the first gear and cause the first gear to rotate in a direction of rotation, and
when the carriage moves in a second direction to return to the first position, the second side of the opening will engage the first gear and also cause the first gear to rotate in the direction of rotation.

16. The footwear item of claim 11, further comprising a clutch that is configured to engage the carriage with the gear train and disengage the carriage from the gear train.

17. The footwear item of claim 11, further comprising a clutch that is configured to:
cause a first gear of the gear train to engage with another component of the gear train when a speed of rotation of the first gear exceeds a threshold; and
cause the first gear to disengage from the other component of the gear train when the speed of rotation does not exceed the threshold.

18. The footwear item of claim 11, wherein the electrical generator comprises a radial permanent magnet generator or an axial permanent magnet generator.

19. The footwear item of claim 11, wherein:
the gear train also comprises a first gear and at least one intermediary gear that is positioned and configured to mechanically interconnect the first gear to the planetary gear; and
the gear train is configured so that each gear in the gear train is positioned along a plane that is substantially parallel to a base.

20. The footwear item of claim 11, wherein the step plate comprises a surface of a linkage that mechanically interconnects the step plate to the carriage so that:
when pressure is applied to the linkage so that the linkage is compressed, the linkage will cause the carriage to move in a first direction away from a first position, and
when pressure is released from the step plate so that the step plate moves up toward the upper position, the linkage will cause the carriage to return to the first position.

21. The footwear item of claim 11, further comprising a power port configured to direct energy that is generated by the electrical generator to a conductor for delivery to an energy storage device.

22. A foot-powered energy generation device, comprising:
a base configured to fit within a footwear item;
a step plate having an upper position and a lower position;
a generator comprising a rotor;
a gear train comprising a first gear and a second gear that are configured so that rotation of the first gear will cause the second gear to rotate, and rotation of the second gear will cause the rotor to rotate; and
a carriage that is mechanically interconnected to the step plate and the first gear so that the carriage will cause the first gear to rotate in response to movement of the step plate between the upper position and the lower position, wherein the carriage comprises an opening configured to receive and engage the first gear;
wherein the opening comprises opposing first and second sides and a lateral dimension between the first and second sides, wherein the lateral dimension is larger than a diameter of the first gear so that:
when the carriage moves in a first direction away from a first position, the first side of the opening will engage the first gear and cause the first gear to rotate in a direction of rotation, and
when the carriage moves in a second direction to return to the first position, the second side of the opening will engage the first gear and cause the first gear to rotate in the direction of rotation.

23. The device of claim 22, further comprising:
a linkage that mechanically interconnects the step plate to the carriage so that:
when pressure is applied to the step plate so that the step plate moves toward the lower position, the linkage will cause the carriage to move in the first direction away from the first position, and
when pressure is released from the step plate so that the step plate moves up toward the upper position, the linkage will cause the carriage to return to the first position.

24. The device of claim 23, wherein the linkage comprises a spring that is also configured to return the step plate to the upper position when pressure is released from the step plate.

25. The device of claim 22, further comprising a clutch that is configured to engage the carriage with the gear train and disengage the carriage from the gear train.

26. The device of claim 22, further comprising a clutch that is configured to:
cause the first gear to be engaged with the second gear when a speed of rotation of the first gear exceeds a threshold; and
cause the first gear to be disengaged from the second gear when the speed of rotation of the first gear does not exceed the threshold.

27. The device of claim 22, wherein the generator comprises a radial permanent magnet generator or an axial permanent magnet generator.

28. The device of claim 22, wherein:
the second gear comprises a planetary gear having a center;
the device also comprises an axis about which a center of a planetary gear and a center of the rotor both rotate;
the gear train also comprises at least one intermediary gear that is positioned and configured to mechanically interconnect the first gear to the planetary gear; and
the gear train is configured so that each gear in the gear train is positioned along a plane that is substantially parallel to the base.

29. The device of claim 22, further comprising the footwear item, and wherein the footwear item comprises an insole or a heel.

30. The device of claim 22, wherein the step plate comprises a surface of a linkage that mechanically interconnects the step plate to the carriage so that:
when pressure is applied to the linkage so that the linkage is compressed, the linkage will cause the carriage to move in a first direction away from a first position, and
when pressure is released from the step plate so that the step plate moves up toward the upper position, the linkage will cause the carriage to return to the first position.

31. A footwear item having energy generating capability, comprising:
a housing that is configured to be worn on a foot, comprising:
a step plate having an upper position and a lower position,
an electrical generator comprising a rotor,
a gear train that is engaged with the rotor so that rotation of at least a portion of the gear train will cause the rotor to rotate, and
a carriage that is mechanically interconnected to the step plate and the gear train so that the carriage will cause components of the gear train to rotate in response to movement of the step plate between the upper position and the lower position, wherein the carriage comprises an opening configured to receive and engage a first gear of the gear train;
wherein the opening is configured to receive the first gear and comprises opposing first and second sides and a lateral dimension between the first and sides, wherein the lateral dimension is larger than a diameter of the first gear so that:
when the carriage moves in a first direction away from a first position, the first side of the opening will engage the first gear and cause the first gear to rotate in a direction of rotation, and
when the carriage moves in a second direction to return to the first position, the second side of the opening will engage the first gear and also cause the first gear to rotate in the direction of rotation.

32. The footwear item of claim 31, wherein the wearable housing comprises an insole, a heel or a sole.

33. The footwear item of claim 31, further comprising:
a linkage that mechanically interconnects the step plate to the carriage so that:
when pressure is applied to the step plate so that the step plate moves toward the lower position, the linkage will cause the carriage to move in a first direction, and
when pressure is released from the step plate, the step plate moves up toward the upper position, and the linkage will cause the carriage to return to the second position.

34. The footwear item of claim 33, wherein the linkage comprises a spring that is also configured to move the step plate toward the upper position when pressure is released from the step plate.

35. The footwear item of claim 31, further comprising a clutch that is configured to engage the carriage with the gear train and disengage the carriage from the gear train.

36. The footwear item of claim 31, further comprising a clutch that is configured to:
- cause the first gear to engage with another component of the gear train when a speed of rotation of the first gear exceeds a threshold; and
- cause the first gear to disengage from the other component of the gear train when the speed of rotation does not exceed the threshold.

37. The footwear item of claim 31, wherein the electrical generator comprises a radial permanent magnet generator or an axial permanent magnet generator.

38. The footwear item of claim 31, wherein:
- the gear train also comprises a planetary gear and at least one intermediary gear that is positioned and configured to mechanically interconnect the first gear to the planetary gear; and
- the gear train is configured so that each gear in the gear train is positioned along a plane that is substantially parallel to the base.

39. The footwear item of claim 31, wherein the step plate comprises a surface of a linkage that mechanically interconnects the step plate to the carriage so that:
- when pressure is applied to the linkage so that the linkage is compressed, the linkage will cause the carriage to move in a first direction away from a first position, and
- when pressure is released from the step plate so that the step plate moves up toward the upper position, the linkage will cause the carriage to return to the first position.

40. The footwear item of claim 31, further comprising a power port configured to direct energy that is generated by the generator to a conductor for delivery to an energy storage device.

41. A footwear item having energy generating capability, comprising:
- a housing that is configured to be worn on a foot, comprising:
  - a step plate having an upper position and a lower position,
  - an electrical generator comprising a rotor,
  - a gear train that is engaged with the rotor so that rotation of at least a portion of the gear train will cause the rotor to rotate,
  - a carriage that is mechanically interconnected to the step plate and the gear train so that the carriage will cause components of the gear train to rotate in response to movement of the step plate between the upper position and the lower position, and
  - a clutch that is configured to engage the carriage with the gear train and disengage the carriage from the gear train;

wherein:
- the gear train also comprises a first gear, a planetary gear and at least one intermediary gear that is positioned and configured to mechanically interconnect the first gear to the planetary gear, and
- the gear train is configured so that each gear in the gear train is positioned along a plane that is substantially parallel to a base.

42. The footwear item of claim 41, wherein the wearable housing comprises an insole, a heel or a sole.

43. The footwear item of claim 41, further comprising:
- a linkage that mechanically interconnects the step plate to the carriage so that:
  - when pressure is applied to the step plate so that the step plate moves toward the lower position, the linkage will cause the carriage to move in a first direction, and
  - when pressure is released from the step plate, the step plate moves up toward the upper position, and the linkage will cause the carriage to return to a second position.

44. The footwear item of claim 43, wherein the linkage comprises a spring that is also configured to move the step plate toward the upper position when pressure is released from the step plate.

45. The footwear item of claim 41, further comprising a clutch that is configured to:
- cause a first gear of the gear train to engage with another component of the gear train when a speed of rotation of the first gear exceeds a threshold; and
- cause the first gear to disengage from the other component of the gear train when the speed of rotation does not exceed the threshold.

46. The footwear item of claim 41, wherein the electrical generator comprises a radial permanent magnet generator or an axial permanent magnet generator.

47. The footwear item of claim 41, wherein the step plate comprises a surface of a linkage that mechanically interconnects the step plate to the carriage so that:
- when pressure is applied to the linkage so that the linkage is compressed, the linkage will cause the carriage to move in a first direction away from a first position, and
- when pressure is released from the step plate so that the step plate moves up toward the upper position, the linkage will cause the carriage to return to the first position.

48. The footwear item of claim 41, further comprising a power port configured to direct energy that is generated by the generator to a conductor for delivery to an energy storage device.

* * * * *